(12) United States Patent
Taguchi et al.

(10) Patent No.: US 8,762,668 B2
(45) Date of Patent: Jun. 24, 2014

(54) MULTIPATH SWITCHING OVER MULTIPLE STORAGE SYSTEMS

(75) Inventors: Yuichi Taguchi, San Jose, CA (US); Futoshi Haga, Cupertino, CA (US); Toshio Otani, Sunnyvale, CA (US)

(73) Assignee: Hitachi, Ltd., Tokyo (JP)

( * ) Notice: Subject to any disclaimer, the term of this patent is extended or adjusted under 35 U.S.C. 154(b) by 777 days.

(21) Appl. No.: 12/948,847

(22) Filed: Nov. 18, 2010

(65) Prior Publication Data

US 2012/0131289 A1 May 24, 2012

(51) Int. Cl.
G06F 12/16 (2006.01)
G06F 12/00 (2006.01)
G06F 15/167 (2006.01)

(52) U.S. Cl.
USPC ............ 711/162; 711/E12.001; 711/E12.103; 711/114; 709/213

(58) Field of Classification Search
None
See application file for complete search history.

(56) References Cited

U.S. PATENT DOCUMENTS

| 7,177,921 | B2 | 2/2007 | Taguchi | |
|---|---|---|---|---|
| 8,489,718 | B1 * | 7/2013 | Brar et al. | 709/222 |
| 2008/0101386 | A1 | 5/2008 | Gray | |
| 2009/0157984 | A1 * | 6/2009 | Hara et al. | 711/154 |
| 2010/0070722 | A1 * | 3/2010 | Otani et al. | 711/162 |

FOREIGN PATENT DOCUMENTS

| JP | 2008-109665 A | 5/2008 |
|---|---|---|
| WO | 2010/119479 A1 | 10/2010 |

OTHER PUBLICATIONS

Skagen, "FCoE & CEE New Data Center Technologies", May 19, 2009, pp. 1-30, Brocade Communications Systems, Inc.
McNamara et al., "Overview of Transparent Interconnection of Lots of Links (TRILL)", NetApp White Paper, Jun. 2010, pp. 1-6, NetApp, Inc.
U.S. Appl. No. 12/646,397, filed Dec. 29, 2009.
What is Trill? Transparent Interconnection of Lots of Links, Oct. 20, 2010. [Internet] URL:http://itpro.nikkeibp.co.jp/article/Keyword/20101019/353114/.

* cited by examiner

*Primary Examiner* — Denise Tran
(74) *Attorney, Agent, or Firm* — Mattingly & Malur, PC

(57) ABSTRACT

A system comprises a first storage system, a second storage system, a plurality of switches, and a server connected with the first storage system via a first group of switches and connected with the second storage system via a second group of switches. The first group and the second group have at least one switch which is not included in both the first and second groups. The first storage system receives I/O commands targeted to first logical units from the server via the first group of switches. The first storage system maintains first information regarding the ports of both the first and second storage systems. The first information is used to generate multipath communication between the server and the first storage system, including at least one path which passes through the second storage system and at least one other path which does not pass through the second storage system.

14 Claims, 24 Drawing Sheets

Local Storage Network Route Information

1406A

| Local Port Address | Remote Port Address | Transfer Cost |
|---|---|---|
| 10:00:B2:BC:02:01 (110A) | 00:0A:1C:01:02:05 (210E) | 1 |
| 10:00:B2:BC:02:01 (110A) | 00:0B:2A:00:22:04 (310A) | 4 |
| 10:00:B2:BC:02:03 (110C) | 50:10:00:E0:B8:02 (520A) | 1 |
| 10:00:B2:BC:02:04 (110D) | 00:0A:1C:01:02:06 (210F) | 2 |
| 10:00:B2:BC:02:04 (110D) | 50:10:00:E0:B8:03 (520B) | 2 |
| : | : | : |

1406B

| Local Port Address | Remote Port Address | Transfer Cost |
|---|---|---|
| 10:00:B2:BC:02:02 (110B) | 00:0A:1C:01:02:06 (210F) | 1 |
| 10:00:B2:BC:02:05 (110E) | 50:10:00:E0:B8:03 (520B) | 1 |
| : | : | : |

Volume Configuration Information

3403

| Mount Point | Target FCID | Target Device | LUN |
|---|---|---|---|
| /mount/data1 | 0x010203 | 50:00:11:22:33:00:00:01 | 1 |
| /mount/data2 | 0x010204 | 50:00:32:22:12:00:00:02 (520A) | 0 (530A) |
| : | : | : | : |

Routing Information

2403

| Local Port Address | Remote Port Address | Transfer Cost |
|---|---|---|
| 00:0A:1C:01:02:01 (210A) | 00:0B:2A:00:22:04 (310A) | 1 |
| 00:0A:1C:01:02:02 (210B) | 00:0A:1C:01:02:04 (210D) | 1 |
| 00:0A:1C:01:02:02 (210B) | 50:10:00:E0:B8:02 (520A) | 4 |
| 00:0A:1C:01:02:03 (210C) | 50:10:00:E0:B8:02 (520A) | 4 |
| : | : | : |

Transmission Port Information

| Remote Port Address | Local Delivery Port Address |
|---|---|
| 00:0B:2A:00:22:04 (310A) | 00:0A:1C:01:02:01 (210A) |
| 50:10:00:E0:B8:02 (520A) | 00:0A:1C:01:02:02 (210B) |
| 50:10:00:E0:B8:02 (520A) | 00:0A:1C:01:02:03 (210C) |
| : | : |

Fig 14

Local Storage Network Route Information

1406A

| Local Port Address | Remote Port Address | Transfer Cost |
|---|---|---|
| 10:00:B2:BC:02:01 (110A) | 00:0A:1C:01:02:05 (210E) | 1 |
| 10:00:B2:BC:02:01 (110A) | 00:0B:2A:00:22:04 (310A) | 4 |
| 10:00:B2:BC:02:03 (110C) | 50:10:00:E0:B8:02 (520A) | 1 |
| 10:00:B2:BC:02:04 (110D) | 00:0A:1C:01:02:06 (210F) | 2 |
| 10:00:B2:BC:02:04 (110D) | 50:10:00:E0:B8:03 (520B) | 2 |
| : | : | : |

14061     14062     14063

1406B

| Local Port Address | Remote Port Address | Transfer Cost |
|---|---|---|
| 10:00:B2:BC:02:02 (110B) | 00:0A:1C:01:02:06 (210F) | 1 |
| 10:00:B2:BC:02:05 (110E) | 50:10:00:E0:B8:03 (520B) | 1 |
| : | : | : |

Fig 15

Shared Storage Network Route Information

1407

14071 14072 14073

| Local Port Address | Remote Port Address | Transfer Cost |
|---|---|---|
| 10:00:B2:BC:02:01 (110A) | 00:0A:1C:01:02:05 (210E) | 1 |
| 10:00:B2:BC:02:01 (110A) | 00:0B:2A:00:22:04 (310A) | 4 |
| 10:00:B2:BC:02:03 (110C) | 50:10:00:E0:B8:02 (520A) | 1 |
| 10:00:B2:BC:02:02 (110B) | 00:0A:1C:01:02:06 (210F) | 1 |
| 10:00:B2:BC:02:05 (110E) | 50:10:00:E0:B8:03 (520B) | 1 |
| : | : | : |

Fig 16

Storage Transmission Port Information

1408

14081     14082

| Remote Port Address | Local Delivery Port Address |
|---|---|
| 00:0B:2A:00:22:04 (310A) | 10:00:B2:BC:02:01 (110A) |
| 00:0B:2A:00:22:04 (310A) | 10:00:B2:BC:02:04 (110D) |
| 50:10:00:E0:B8:02 (520A) | 10:00:B2:BC:02:03 (110C) |
| : | : |

Fig 17

LU Configuration Information

1409

14091              14092              14093        14094

| Local Port Address | World Wide Name | LUN | Storage Resource ID |
|---|---|---|---|
| 50:10:00:E0:B8:02 (520A) | 50:00:11:22:33:00:00:01 (520A) | 0 | RG#8 |
| 50:10:00:E0:B8:02 (520A) | 50:00:11:22:33:00:00:01 (520A) | 1 | RG#9 |
| : | : | : | : |

MULTIPATH SWITCHING OVER MULTIPLE STORAGE SYSTEMS

BACKGROUND OF THE INVENTION

The present invention relates generally to multipath storage systems and, more particularly, to nondisruptive data migration and I/O load balancing over multipath connections by running a virtual switch across storage systems and multipathing among storage and server.

According to recent trends, a new multipath networking method known as TRILL (Transparent Interconnection of Lots of Links) is under standardization process for networking over Layer 2 (L2) Ethernet. TRILL allows L2 network to establish two parallel data transfer paths that have not been allowed in traditional Ethernet based on STP (Spanning Tree Protocol). When TRILL is set up and ready in a storage network, data transfer between server and storage will be performed through multiple paths.

FIG. 1 is an example of a conventional storage area network topology. A server computer 300 is coupled to a switch 200A, which is coupled to switches 200B and 200C in parallel, which are coupled to a switch 200D, which is coupled to a data storage 200. Data transfer from/to server to/from storage is executed through a path 300-200A-200B-200D-100 and 300-200A-200C-200D-100 in parallel. In this case, there may be a performance bottleneck at the network port 210A of the switch 200D or the network port 110 of the data storage 100 that cannot handle too much traffic received through both of the paths.

In addition to L2 networking, another problem is that I/O service interruption happens through data migration beyond storage systems. FIG. 2 is an example of a conventional logical configuration of a storage area network. A server computer 300 mounts one or more logical units 530 served by a storage system 100A. An operating system running on the server 300 recognizes the logical units 530 by a network port 110A identified by its network address (MAC Address, FCID) or WWN (World Wide Name). If an administrator tries to migrate a logical unit 530 from the network port 110A to a port 110B, a server operating system must stop I/O process to suspend the static data image stored in the logical unit, and to re-mount a new logical unit through the destination network port 110B. However, a mission critical application or a business critical application running at an Enterprise Datacenter cannot be suspended while keeping its business stability.

The same problem arises when a logical unit is to be migrated beyond the storage system boundary, for instance, from the port 110A of one storage system 100A to a port 110C of another storage system 100B. It requires data copy operation among systems, so that the I/O suspension time will be longer than internal LU migration. Furthermore, an additional problem of traditional single path network is that I/O service could be interrupted after the removal of the storage system 100A because the network path must be reset onto the new data storage device.

BRIEF SUMMARY OF THE INVENTION

Exemplary embodiments of the invention provide nondisruptive data migration and I/O load balancing over multipath connections by running a virtual switch across storage systems and multipathing among storage and server. The data storage is equipped with switching functionality and virtual port (network interface). Network routing and path configuration setting are shared among multiple data storage systems. Logically, a single virtual network switch runs across multiple data storage systems. Network devices have the capability to establish multipath communication between server and storage. This allows I/O service continuation after removal of old data storage device, because another data path keeps communication alive with the migration target device. In this way, the invention allows running a virtual switch across storage systems and multipathing among storage and server, so as to complete non-disruptive data migration and I/O load balancing over multipath connections.

In accordance with an aspect of the present invention, a system comprises a first data storage system including at least one first interface port, a first CPU, a first memory, and a plurality of first logical units; a second data storage system including at least one second interface port, a second CPU, a second memory, and a plurality of second logical units, the second data storage system connected to the first data storage system; a plurality of switches; and a server which is connected with the first data storage system via a first group of the switches and is connected with the second data storage system via a second group of the switches, the first group and the second group having at least one switch which is not included in both the first group and the second group. The first data storage system receives I/O commands targeted to the plurality of first logical units from the server via the first group of switches. The first data storage system maintains a first information regarding the ports of both the first storage system and the second data storage system. The first information is used to generate multipath communication between the server and the first data storage system, including at least one path which passes through the second data storage system and at least one other path which does not pass through the second data storage system.

In some embodiments, the first information includes information related to paths between ports of the first data storage system, the second data storage systems, the plurality of switches, and the server. The first information includes load information for transmitting data between ports of the first data storage system and the plurality of switches and the server and load information for transmitting data between ports of the second data storage system and the plurality of switches and the server. The ports of both the first and second data storage systems are identified by WWPN.

In specific embodiments, one of the first and second data storage systems is a source system for migration of data to the other of the first and second data storage systems as a destination system. For data migration, the destination system creates a virtual port as a target port which has same identifier as a source port on the source system, and creates a logical unit on the target port, the source system runs data copy from a logical unit containing the data in the source system to the logical unit on the target port in the destination system, and deactivates the source port on the source system, and the destination system activates the target port on the destination system. In response to a detection of a device newly connected to one of the ports of the first data storage system, the first data storage system adds information related to a path between the newly connected device and the connected port of the first data storage system and notifies the added information to the plurality of switches, the server, and the second data storage system via connections to the first data storage system. A management computer is connected to one of the switches. In response to a request from the management computer, the switch updates path information between ports of the server and at least one of the first and second data storage systems.

Another aspect of this invention is directed to a first data storage system in a system which includes a second data storage system having at least one second interface port, a plurality of switches, and a server which is connected with the first data storage system via a first group of the switches and is connected with the second data storage system via a second group of the switches, the first group and the second group having at least one switch which is not included in both the first group and the second group. The first data storage system comprises at least one first interface port; a first CPU; a first memory; and a plurality of first logical units. The first data storage system receives I/O commands targeted to the plurality of first logical units from the server via the first group of switches. The first data storage system maintains a first information regarding the ports of both the first storage system and the second data storage system. The first information is used to generate multipath communication between the server and the first data storage system, including at least one path which passes through the second data storage system and at least one other path which does not pass through the second data storage system.

In some embodiments, the second data storage system is a source system for migration of data to the first data storage system as a destination system. For data migration, the first data storage system creates a virtual port as a target port which has same identifier as a source port on the second data storage system, creates a logical unit on the target port, and activates the target port on the first data storage system, after data copy is run from a logical unit containing the data in the second data storage system to the logical unit on the target port in the first data storage system, and after the source port on the second data storage system is deactivated.

Another aspect of the invention is directed to a multipath communication method in a system which includes a first data storage system including at least one first interface port, a first CPU, a first memory, and a plurality of first logical units; a second data storage system including at least one second interface port, a second CPU, a second memory, and a plurality of second logical units, the second data storage system connected to the first data storage system; a plurality of switches; and a server which is connected with the first data storage system via a first group of the switches and is connected with the second data storage system via a second group of the switches, the first group and the second group having at least one switch which is not included in both the first group and the second group. The method comprises receiving an I/O command targeted to at least one of the plurality of first and second logical units from the server via the switches; maintaining a first information regarding the ports of both the first storage system and the second data storage system; and using the first information to generate multipath communication between the server and the first data storage system, including at least one path which passes through the second data storage system and at least one other path which does not pass through the second data storage system.

In specific embodiments, the method further comprises a data migration process for migrating data from one of the first and second data storage systems as a source system to the other of the first and second data storage systems as a destination system. The data migration process comprises creating a virtual port as a target port which has same identifier as a source port on the source system; creating a logical unit on the target port; running data copy from a logical unit containing the data in the source system to the logical unit on the target port in the destination system; deactivating the source port on the source system; and activating the target port on the destination system. In response to a request from a management computer, the method further comprises updating path information between ports of the server and at least one of the first and second data storage systems.

These and other features and advantages of the present invention will become apparent to those of ordinary skill in the art in view of the following detailed description of the specific embodiments.

BRIEF DESCRIPTION OF THE DRAWINGS

FIG. 12 illustrates an exemplary data structure of the volume configuration information in the memory of the server computer.

FIG. 13 illustrates an exemplary data structure of the routing information in the memory of the switch.

FIG. 14 illustrates an exemplary data structure of the transmission port information in the memory of the switch.

FIG. 15 illustrates an exemplary data structure of the local storage network route information in the memory of the data storage.

FIG. 16 illustrates an exemplary data structure of the shared storage network route information in the memory of the data storage.

FIG. 17 illustrates an exemplary data structure of the storage transmission port information in the memory of the data storage.

FIG. 18 illustrates an exemplary data structure of the LU configuration information in the memory of the data storage.

DETAILED DESCRIPTION OF THE INVENTION

Figure 1:
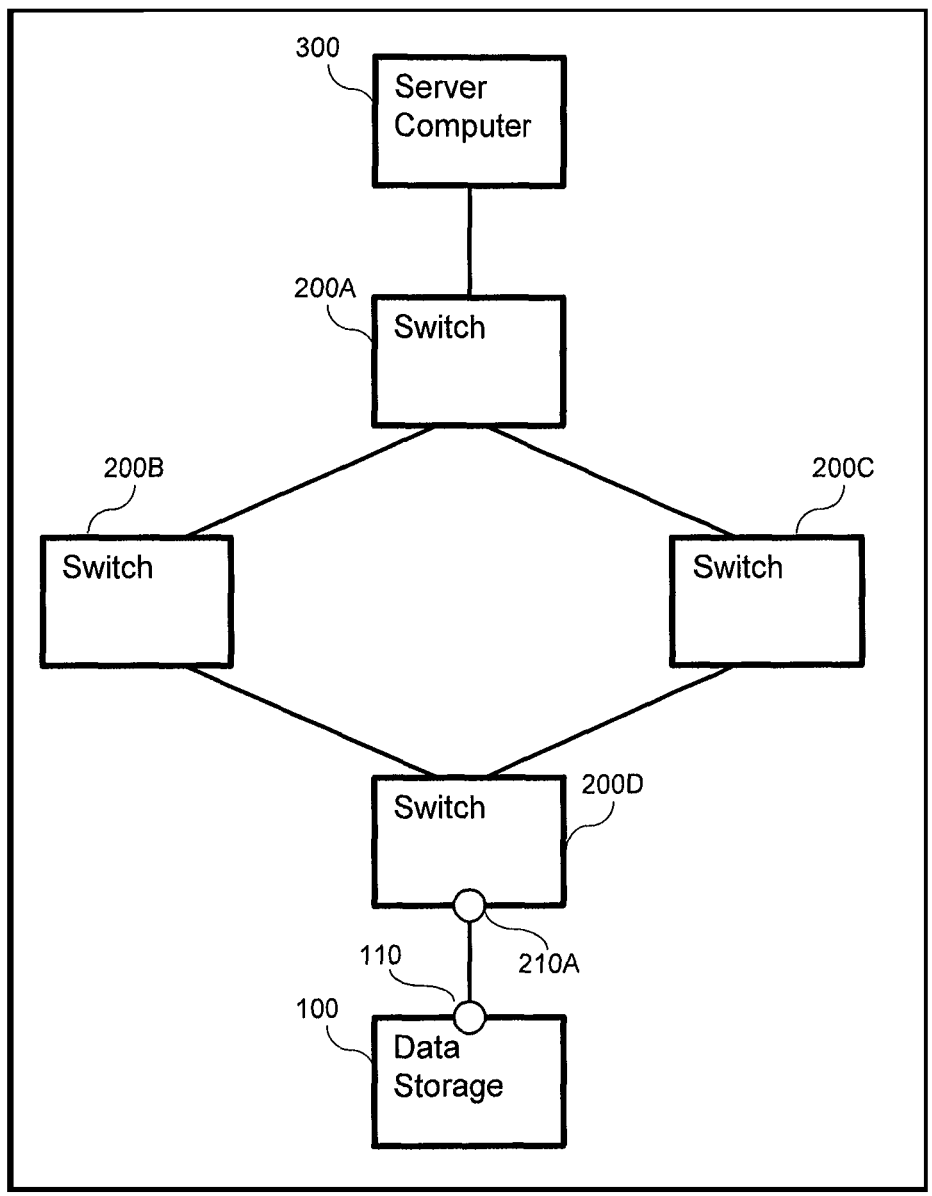
FIG. 1 is an example of a conventional storage area network topology.
Figure 2:
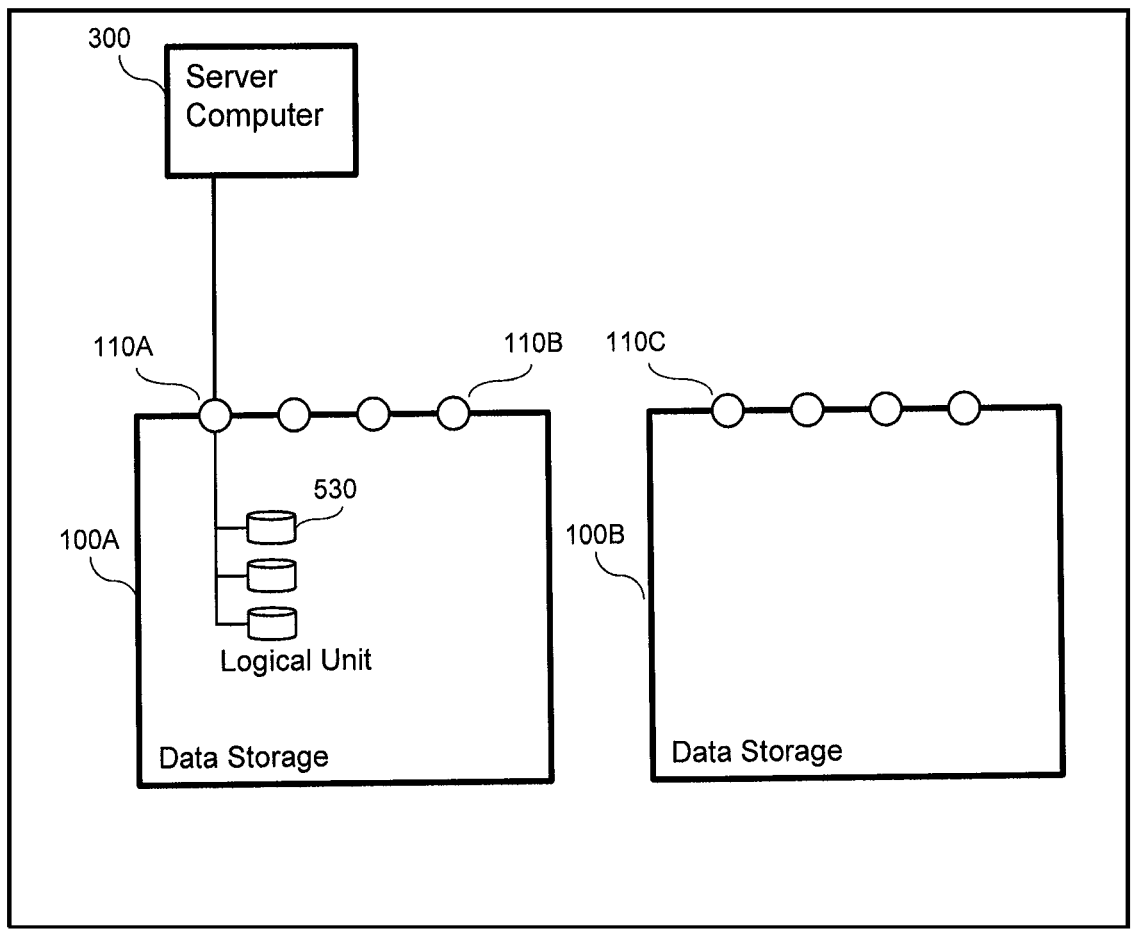
FIG. 2 is an example of a conventional logical configuration of a storage area network.

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment," "this embodiment," or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for nondisruptive data migration and I/O load balancing over multipath connections by running a virtual switch across storage systems and multipathing among storage and server.

Figure 3:
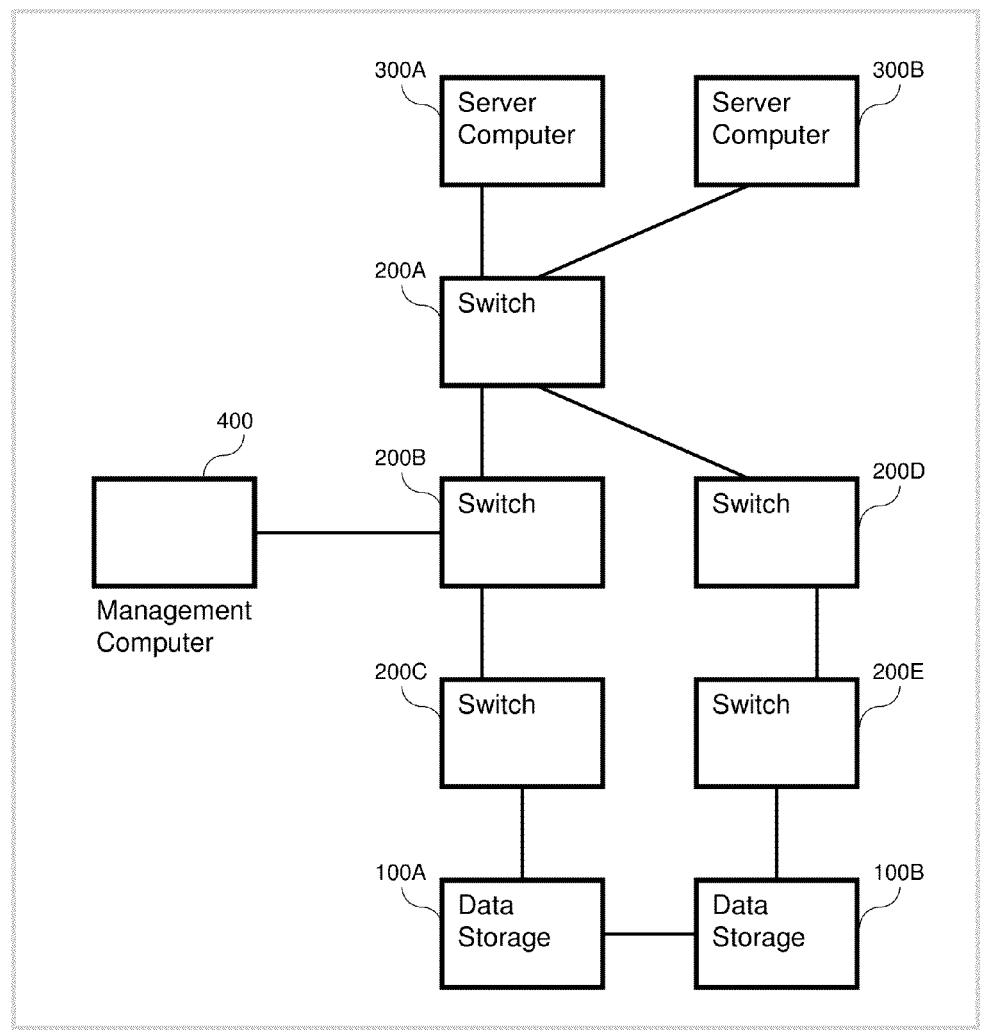
FIG. 3 shows an example of a storage network configuration according to an embodiment of the present invention.

FIG. 3 shows an example of a storage network configuration according to an embodiment of the present invention. First and second server computers 300A and 300B are coupled to a switch 200A, which is coupled to two switches 200B and 200D. The switch 200B is connected to a switch 200C which is connected to a first data storage 100A. The switch 200 D is connected to a switch 200E which is connected to a second data storage 100B. A management computer 400 is connected to the switch 200B. The server 300 runs business applications and generates I/O workload that targets a storage 100. The switch 200 is a network switch, i.e., Layer 2 Ethernet switch that supports TRILL protocol. The data storage 100 is an external storage system that is installed with a bunch of disk drives (HDDs) or solid state drives (SSDs). The management computer 400 provides management of the entire storage network. In FIG. 3, communication between the first server computer 300A and the first data storage 100A can be established through both paths 300A-200A-200B-200C-100A and 300A-200A-200D-200E-100B-100A.

Figure 4:
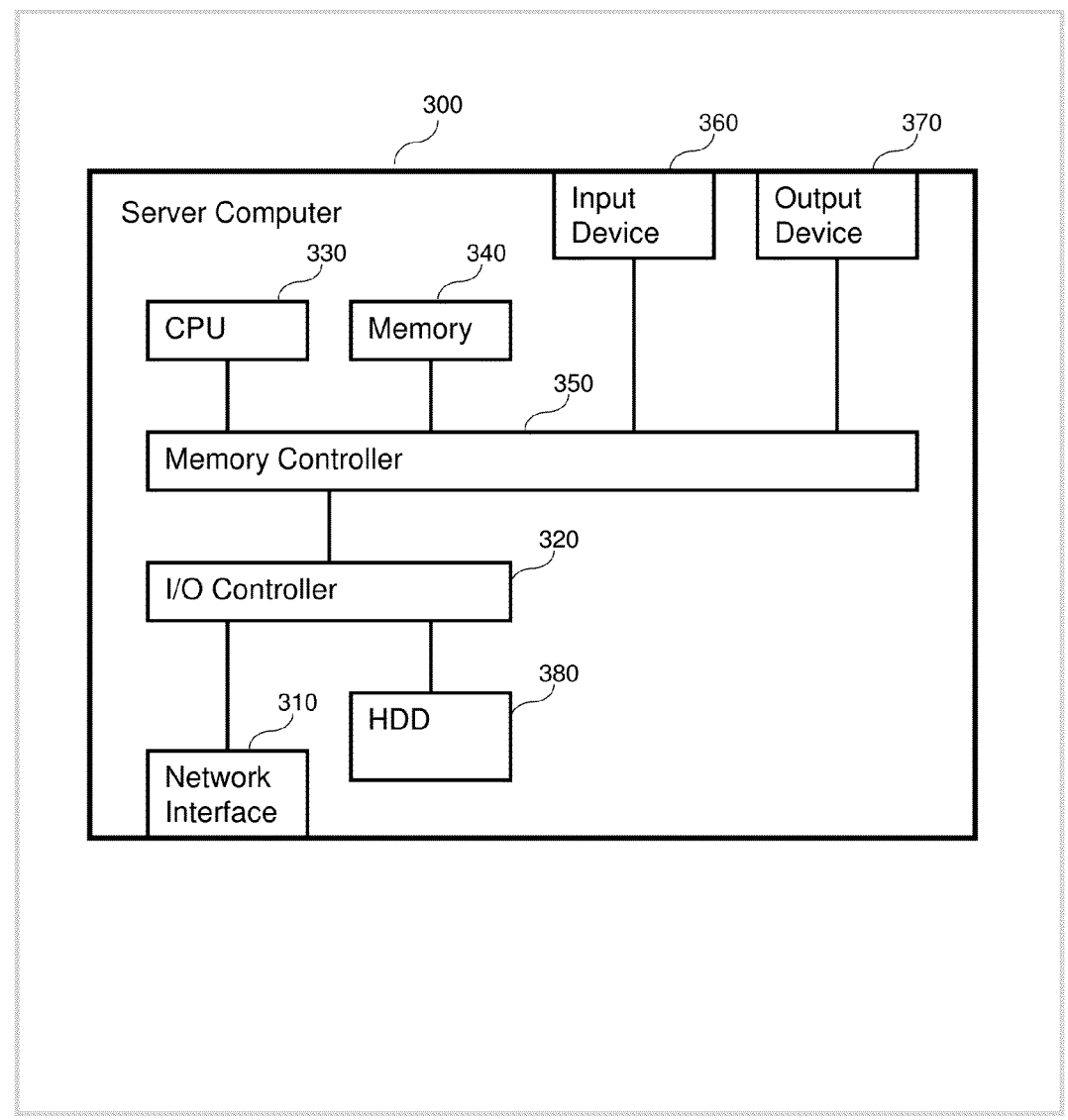
FIG. 4 illustrates a hardware configuration of the server computer.

FIG. 4 illustrates a hardware configuration of the server computer 300. A CPU 330, a memory 340, an input device 360 (e.g., keyboard, mouse, etc.), and an output device 370 (e.g., video graphic card connected to external display monitor) are interconnected through a memory controller 350. All I/Os handled by an I/O controller 320 are processed on an internal HDD device 380 or an external storage device through a network interface 310. This configuration can be implemented by a multi-purpose PC.

Figure 5:
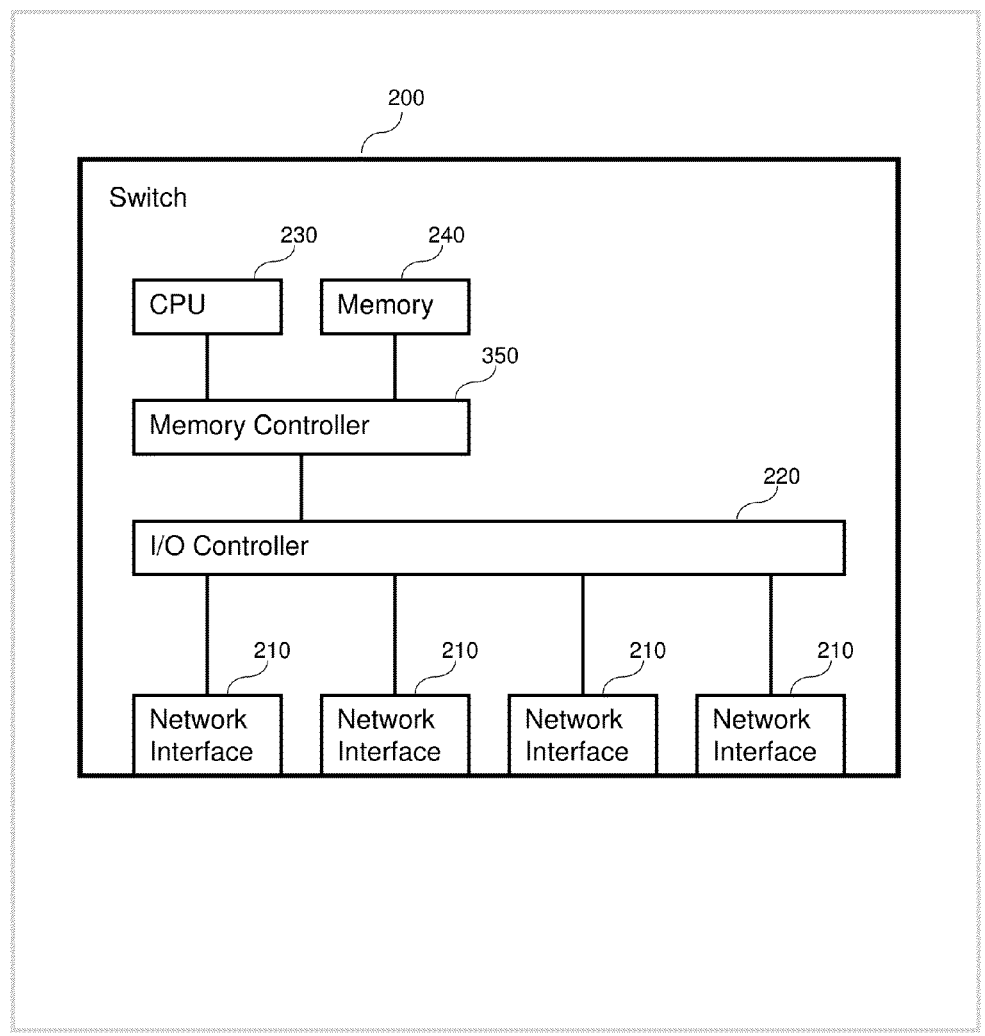
FIG. 5 illustrates a hardware configuration of the network switch.

FIG. 5 illustrates a hardware configuration of the network switch 200. A CPU 230 and a memory 240 are interconnected through a memory controller 250. The I/Os handled by an I/O controller 220 are processed through a plurality of network interfaces 210.

Figure 6:
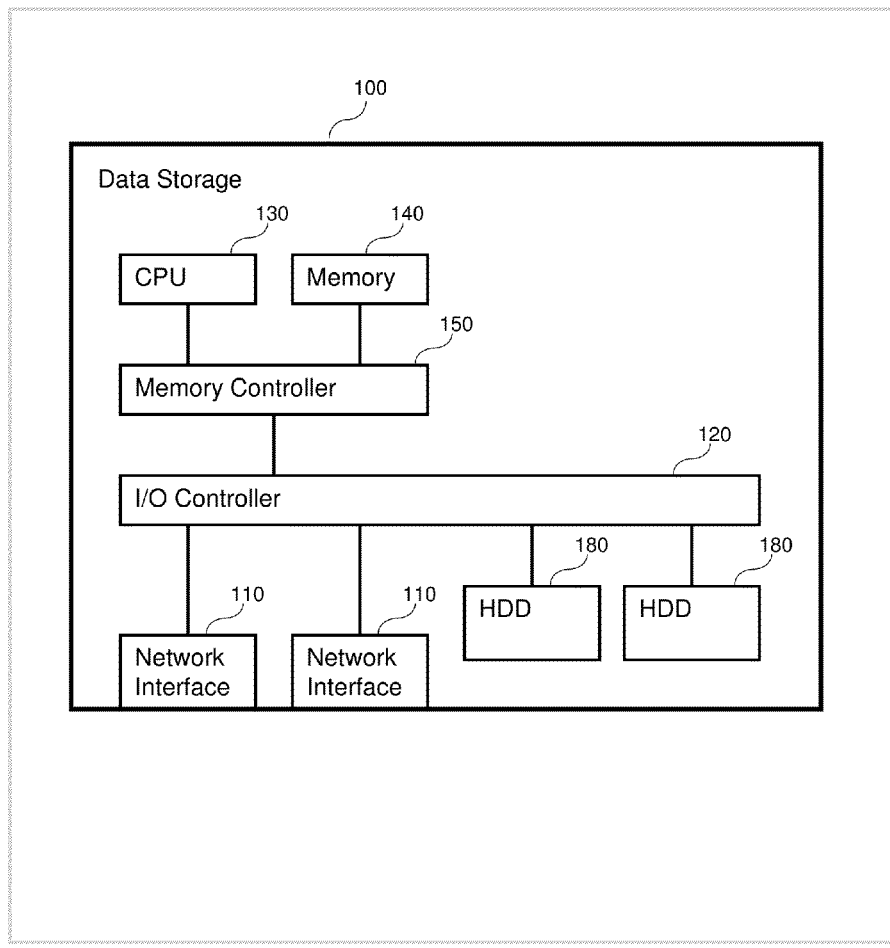
FIG. 6 illustrates a hardware configuration of the data storage.

FIG. 6 illustrates a hardware configuration of the data storage 100. A CPU 130 and a memory 140 are interconnected through a memory controller 150. The I/Os handled by an I/O controller 120 are processed on internal HDD devices 180 or external storage devices through network interfaces 310.

Figure 7:
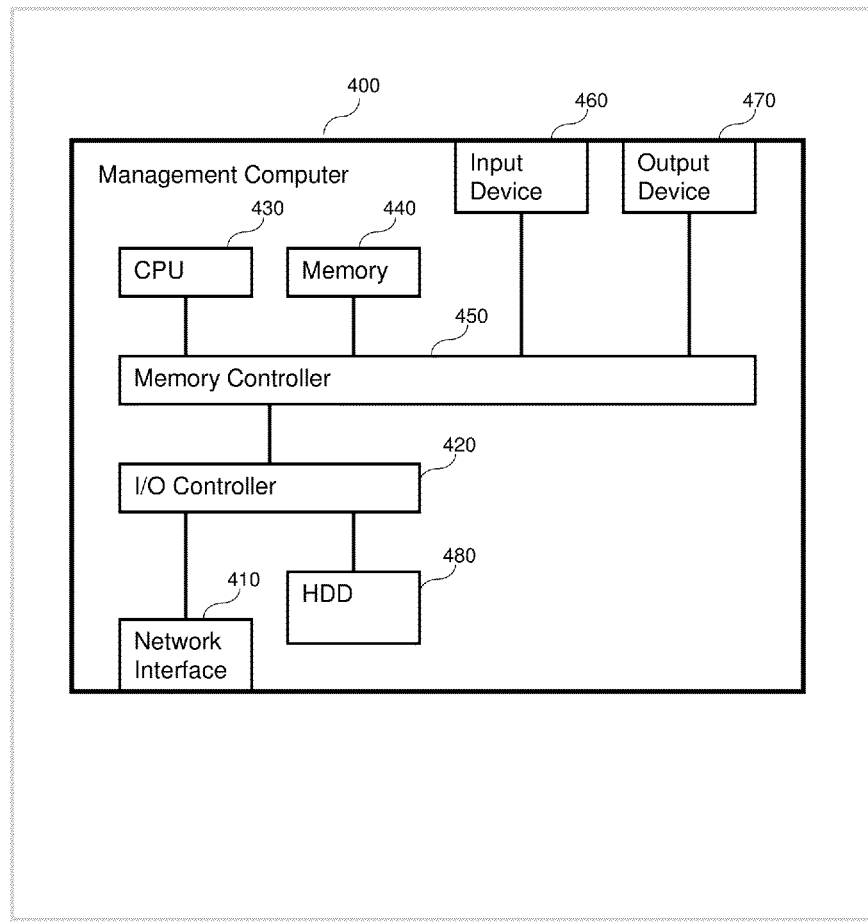
FIG. 7 illustrates a hardware configuration of the management computer.

FIG. 7 illustrates a hardware configuration of the management computer 400. A CPU 430, a memory 440, an input device 460, and an output device 470 are interconnected through a memory controller 450. The I/Os handled by an I/O controller 420 are processed on an internal HDD device 480 or an external storage device through a network interface 410.

Figure 8:
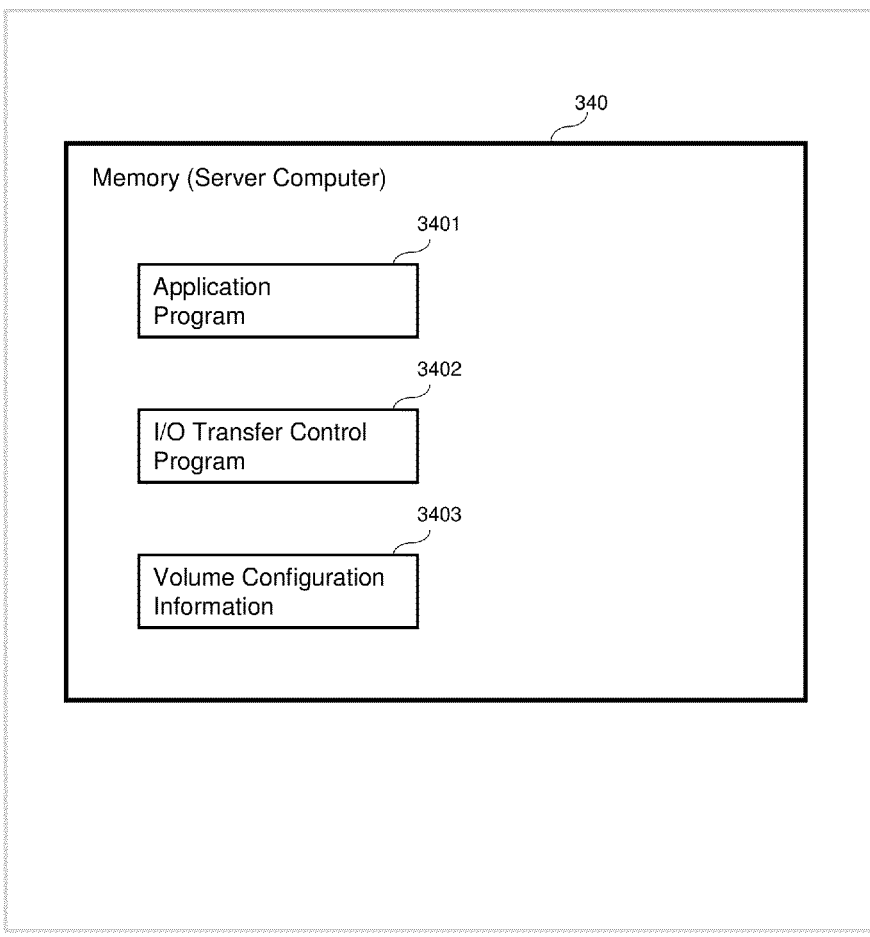
FIG. 8 illustrates an example of software that is stored on the memory and runs on the server computer.

FIG. 8 illustrates an example of software that is stored on the memory 340 and runs on the server computer 300. An application program 3401 is a business application that generates I/O workload (e.g., database, SAP, E-Mail, exchange server, web application, etc.). An I/O transfer control program 3402 controls external data I/O transfer communication over SCSI protocol and also setup communication path between the server 300 and the storage 100. Volume configuration information 3403 is a configuration definition of data volume handled by the server operating system. "/etc/fstab" is a simple example of the volume configuration information 3403. Its data structure is illustrated in FIG. 12.

Figure 9:
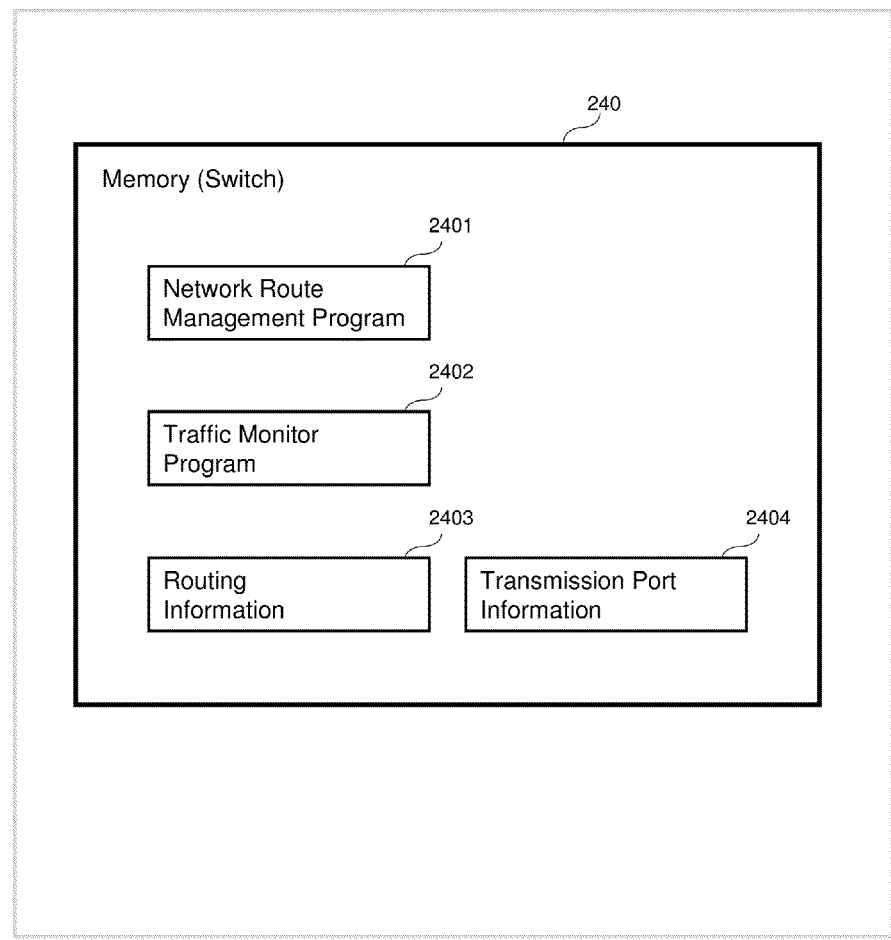
FIG. 9 illustrates an example of software that is stored on memory and runs on the switch.

FIG. 9 illustrates an example of software that is stored on memory 240 and runs on the switch 200. Network route management program 2401 is a program to set and release communication route over the network. Traffic monitor program 2402 is a program to measure the traffic by the network interface 210. It can be measured by metric such as bps (byte per sec) and IOPS. Route information 2403 is configuration data that expresses communication route set by the network route management program 2401. Transmission port information 2404 is configuration data that expresses a target network interface 210 to transmit data. Routing information 2403 and transmission port information 2404 make it possible to determine communication paths over the network.

Figure 10:
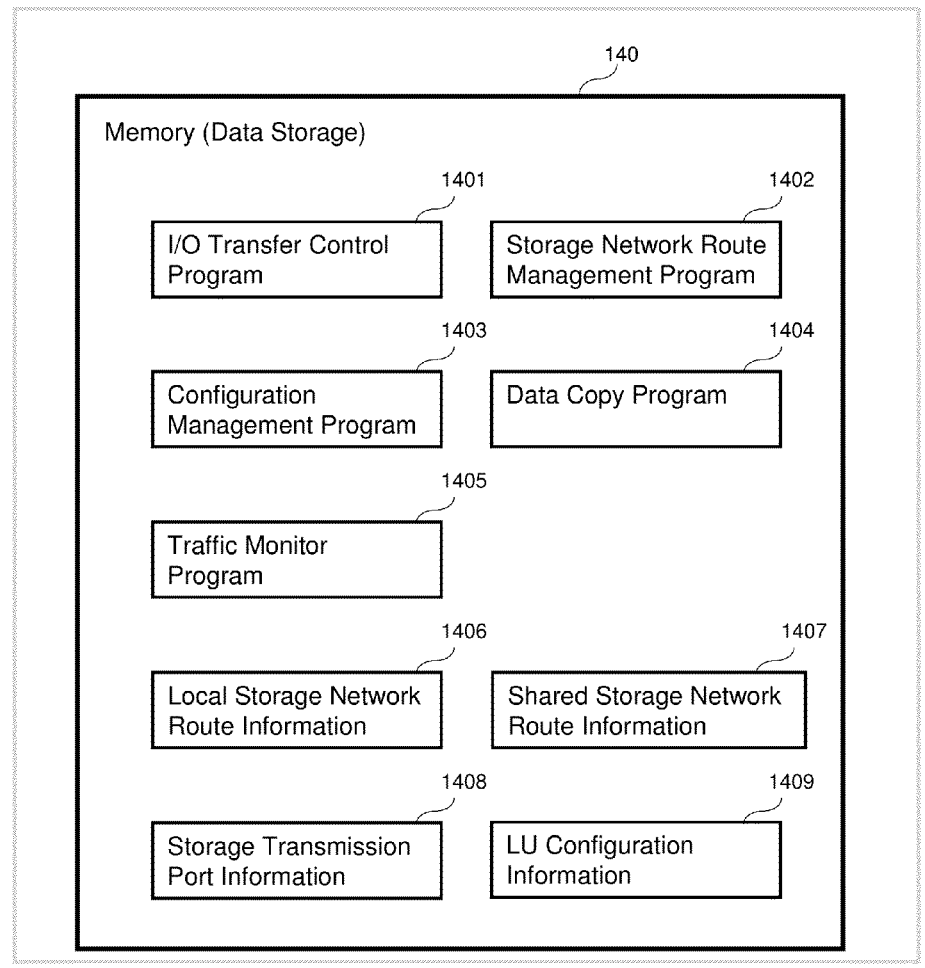
FIG. 10 illustrates an example of software that is stored on the memory and runs on the data storage.

FIG. 10 illustrates an example of software that is stored on the memory 140 and runs on the data storage 100. I/O transfer control program 1401 operates external data I/O transfer communication over SCSI protocol and also sets up communication path between the data storage 100 and the server 300. Storage network route management program 1402 is a unique program in this invention. This program generates and updates local storage network route information 1406 and shared storage network route information 1407. It merges route information created by several data storage systems, so as to keep consistency among the storage systems. Configuration management program 1403 updates logical unit configuration as directed by the management computer 400. Data copy program 1404 copies entire data stored in one logical unit 530 into another logical unit 530 so that the original logical unit 530 is duplicated. Traffic monitor program 1405 measures I/O traffic by network interface 110 and logical unit 530. Its metric is acceptable in bps (byte per sec), IOPS, and the like. Shared storage network route information 1407 is information shared among multiple data storage systems 100. It defines communication routes over the network. Storage transmission port information 1408 allows determining communication paths over the network. LU configuration information 1409 is a configuration setting of the logical units 530.

Figure 11:
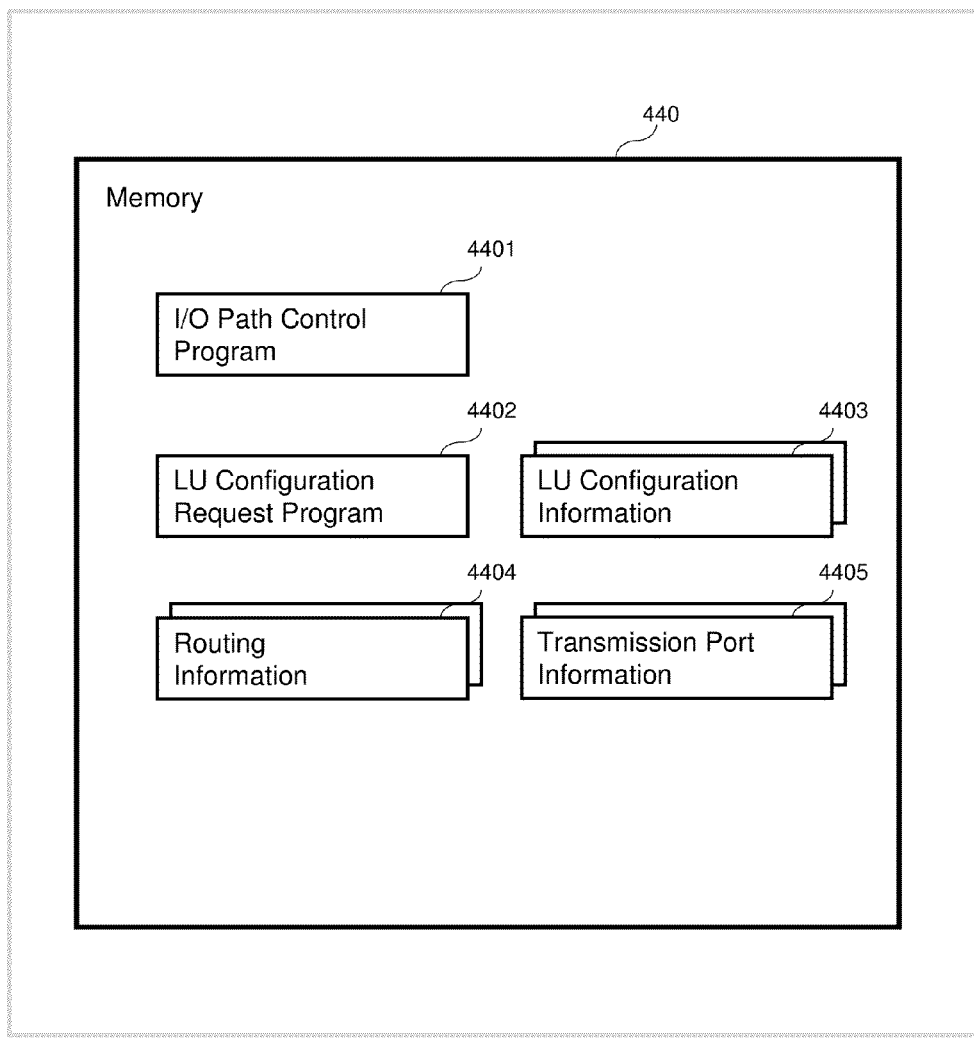
FIG. 11 illustrates an example of software that is stored on the memory and runs on the management computer.

FIG. 11 illustrates an example of software that is stored on the memory 440 and runs on the management computer 400. I/O path control program 4401 communicates with devices that comprise the storage network. It issues requests to set or update communication paths. LU configuration request program 4402 communicates with the data storage 100. It issues requests to set or update the logical units 530. LU configuration information 4403 is a collection of LU configuration information 1408 from multiple data storage systems 100. Routing information 4404 is a collection of routing information 2403 and shared storage network route information 1407 from multiple switches 200 and data storage systems 300. Transmission port information 4405 is a collection of transmission port information 2404 and storage transmission port information 1408. Information collected from the switch 200 and information collected from the data storage 100 do not have to be distinguished, but can be handled in the same manner. The management computer 400 updates those pieces of information so that it always keeps the newest configuration. The memory 140 of the data storage 100 includes mapping information between the physical ports and virtual ports, so that virtual ports may be treated as physical ports. The relation between the virtual port and the physical port may not be limited to a one-to-one relationship. One physical port may be associated with multiple virtual ports and one virtual port may be associated with multiple physical ports. The mapping information should be controlled by the management computer; thus the mapping information of the data storages 100 may be integrated in the memory 440 of the management computer 400 and the updates would be communicated to each other.

FIG. 12 illustrates an exemplary data structure of the volume configuration information 3403 in the memory 340 of the server computer 300. Mount point 34031 is a logical directory defined on a file system. An external device such as a logical unit is mounted to this location. Target FCID 34032 is the identification of the network interface 110 that is dynamically assigned by the fibre channel network when it initialized a fabric login process. Target device 34033 is an identification of network interface 110. World Wide Name is usually used as an identifier in the fibre channel network. LUN 34034 is a "logical unit number" that is assigned to each logical unit 530.

FIG. 13 illustrates an exemplary data structure of the routing information 2403 in the memory 240 of the switch 200. Local port address 24031 is a network interface installed on the switch 200. Remote port address 24032 is a port installed on the other devices. The remote port must be reachable from the local port address over one or more switches 200. Transfer cost 24033 is a hop count of the devices to reach from local port to remote port.

FIG. 14 illustrates an exemplary data structure of the transmission port information 2404 in the memory 240 of the switch 200. Remote port address 24031 is a network interface installed on the other devices. Local delivery port address 24032 is a local network interface to communicate and transmit data with the remote port.

FIG. 15 illustrates an exemplary data structure of the local storage network route information 1406 in the memory 140 of the data storage 100. A first table 1406A is an example of the route information generated on the first storage 100A of FIG. 19. A second table 1406B is an example of the route information generated on second storage 100B of FIG. 19. Local port address 14061, remote port address 14062, and transfer cost 14063 represent the same entities serving the same functions, respectively, as those in FIG. 13. A unique feature in this table is that the virtual port 520 set on this data storage 100 can be recorded as same as the physical port 110.

FIG. 16 illustrates an exemplary data structure of the shared storage network route information 1407 in the memory 140 of the data storage 100. Local port address 14071 is a network interface 110 installed on one of the data storage systems 100. Remote port address 14072 is a network interface installed on an external device other than the data storage systems 100. The remote port must be reachable from the local port. Transfer cost 14073 is a hop count of the devices to reach from local port to remote port. The contents of the table in FIG. 16 are consistent with the storage network topology in FIG. 19. For example, the network interface 110A on the data storage 100A is directly connected to the network interface 210E on the switch #23, so that the transfer cost is counted as "1." On the other hand, a route from the network interface 110A to the network interface 310A on the server 300A requires hops of four devices. A unique feature on third entry, network interface 110C is logically considered as connected to virtual port 520A. When the data storage 100 detects a configuration change on the other storage system(s) 100, it updates its route information to keep the information current and consistent.

FIG. 17 illustrates an exemplary data structure of the storage transmission port information 1408 in the memory 140 of the data storage 100. Remote port address 14081 is a network interface 110 installed on the other devices. Local delivery port address 14082 is a local network interface 110 to communicate and transmit data with the remote port.

FIG. 18 illustrates an exemplary data structure of the LU configuration information 1409 in the memory 140 of the data storage 100. Local port address 14091 is a network interface 110 or virtual network interface 520 defined on the storage 100. The virtual network interface 520 is not a physical network interface 110 but behaves as if it were installed on the data storage 100 against the server computer 300. World Wide Name 14092 is the identification of the network interface 110 or virtual network interface 520. LUN 14093 is a "logical unit number" to identify the logical unit 530 defined on the network interface 110 or virtual network interface 520. Storage resource ID 14094 is a physical storage resource such as RAID group or a set of HDDs or SSDs.

Figure 19:
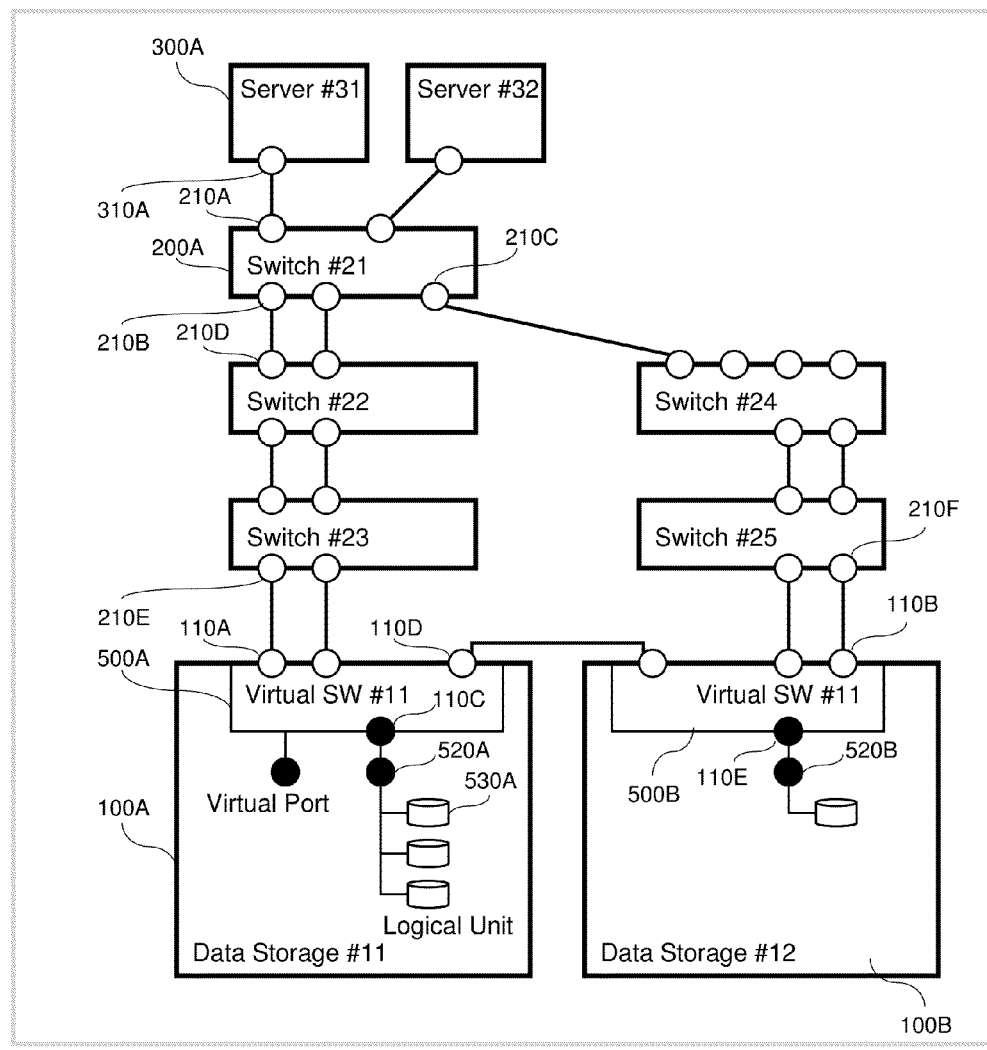
FIG. 19 illustrates an example of the storage network topology according to the present embodiment.

FIG. 19 illustrates an example of the storage network topology according to the present embodiment. The first server 300A attaches a logical unit 530A that is defined on a virtual network port 520A in the first data storage 100A at "/mount/data2" (see FIG. 12). The switch 200A is configured to use dual communication paths to the virtual network port 520A, through the network interfaces 210B and 210C (see FIGS. 13 & 14). Originally this configuration does not happen because one path "210C-#24-#25-110B-110D-520A" has a transfer cost of "5" to get to the virtual port 520A, which is not equivalent to another path "210B-#22-#23-110A-520A" having a transfer cost of only "4." This is allowed by considering multiple virtual switches as a single device, as defined in FIG. 16. From the viewpoint of the server computer 300 and the switch 200, physically multiple data storage systems 100 are recognized as a single data storage 100. This aspect of the present embodiment solves the first problem of bottleneck mentioned above in the Background section. The bottleneck on the direct attached switch #23 will not occur because another path is routed via the second data storage 100B.

Figure 20:
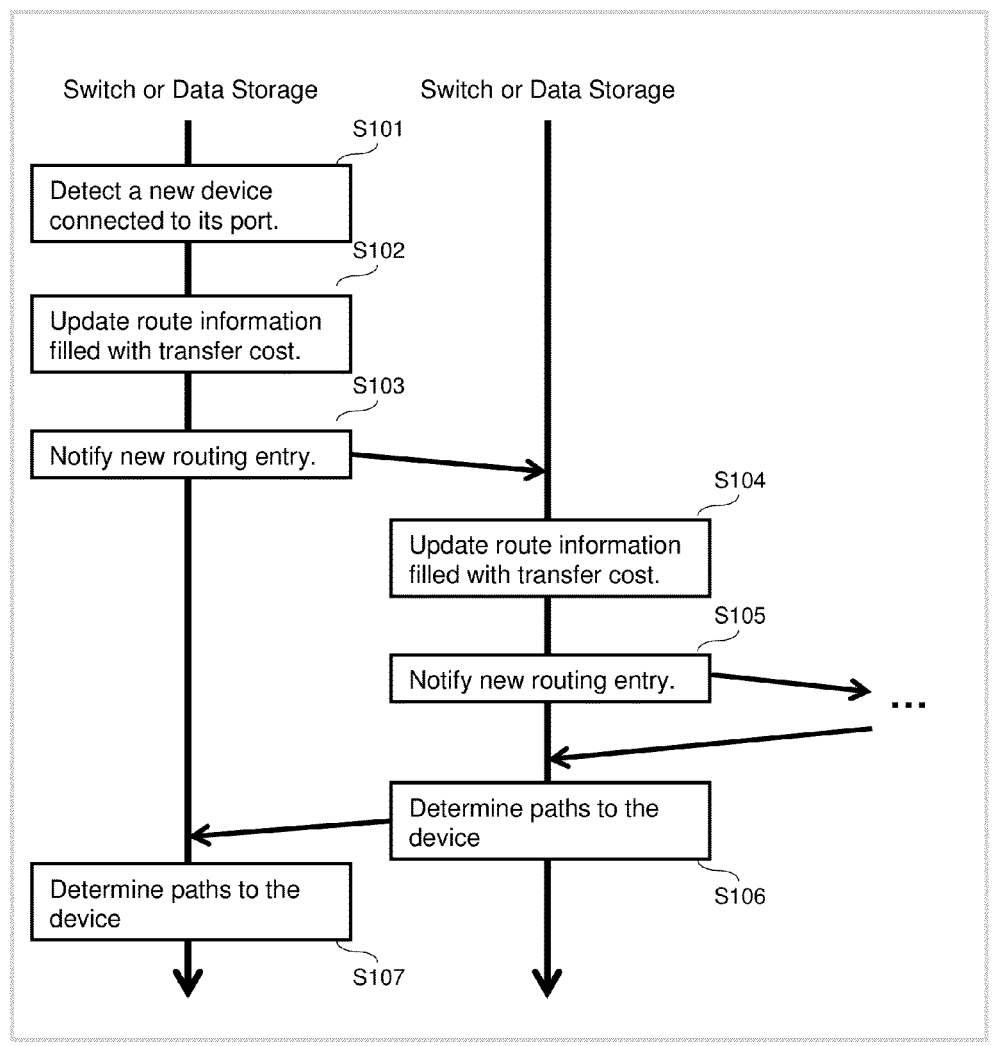
FIG. 20 is an example of a flow diagram to update the routing information and transmission port information on switch, or the shared local storage network route information and storage transmission port information on the data storage.

FIG. 20 is an example of a flow diagram to update the routing information 2403 and transmission port information 2404 on switch 200, or the shared local storage network route information 1406 and storage transmission port information 1408 on the data storage 100. First of all, the switch 200 or data storage 100 detects a device newly connected to the network interface 210 or 110 (step S101). Then it creates a new entry on the routing information 2403 or 1406, then record "1" in its transfer cost field 24033 or 14063 (step S102). The switch 200 or data storage 100 then notifies a new entry record to the other devices connected directly through its network interface 210 or 110 (step S103). Next, the switch 200 or data storage 100 which has received a new device discovery notification updates its routing information 2403 or 1406 (step S104). In this case, the transfer cost field 24033 or 14063 will be added "1." This device repeats notification to the other network devices (step S105). After that, it determines one or more paths to get to the newly detected network interface (step S106, step S107). In the step S106 and the step S107, the switch 200 or data storage 100 selects one or more network interfaces 210 or 110 that have minimum transfer cost to get to the new device and updates the transmission port information 2404 or 1407.

Figure 21:
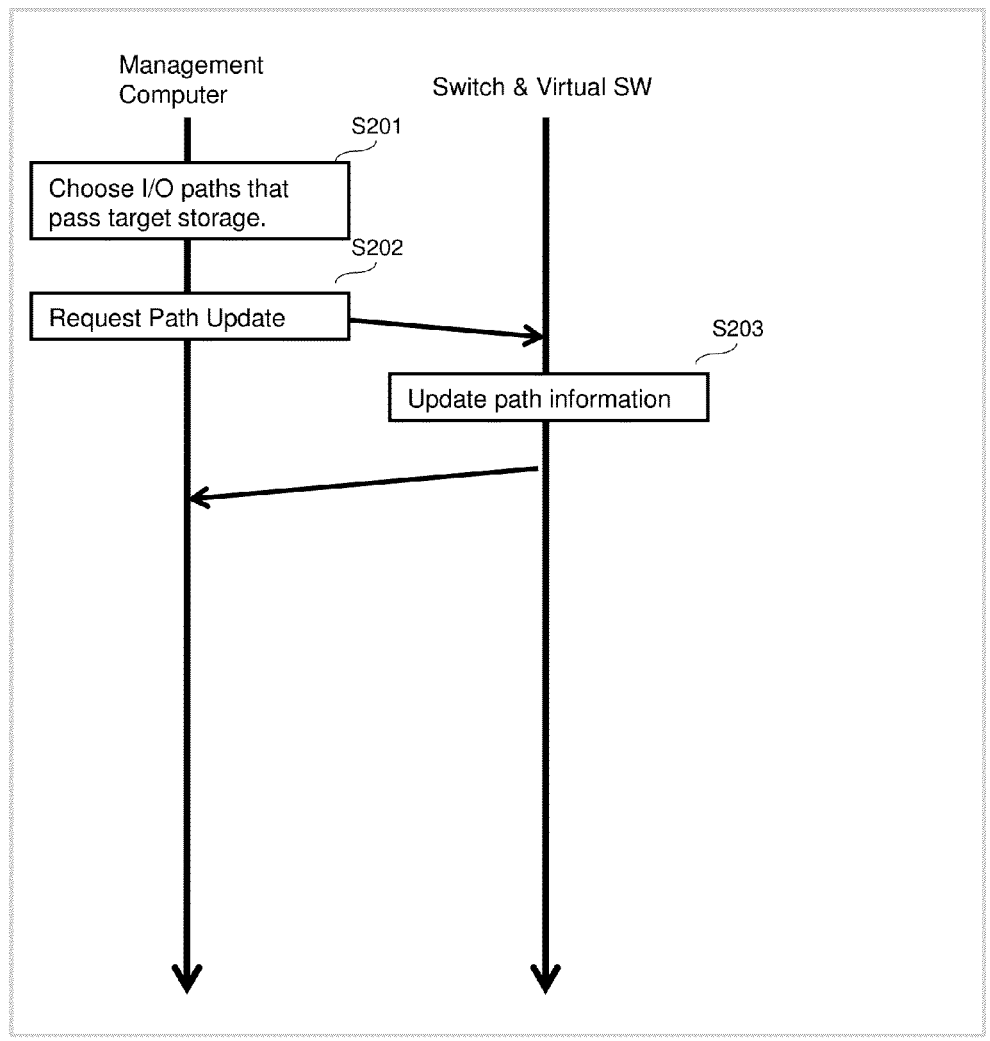
FIG. 21 is an example of a flow diagram to select one or more paths from the server to the storage.

FIG. 21 is an example of a flow diagram to select one or more paths from the server 300 to the storage 100. This is not a mandatory process but optional. In step S201, the management computer 400 chooses I/O paths that pass the target storage 100. In step S202, the management computer 400 requests path update. In step 203, the switch and virtual switch updates the path information. This is a conventional option, especially in a situation where an administrator wants to control its network traffic after monitoring and analyzing the data traffic. Also this is useful when three or more paths are available and the administrator wants to reduce them.

Figure 22:
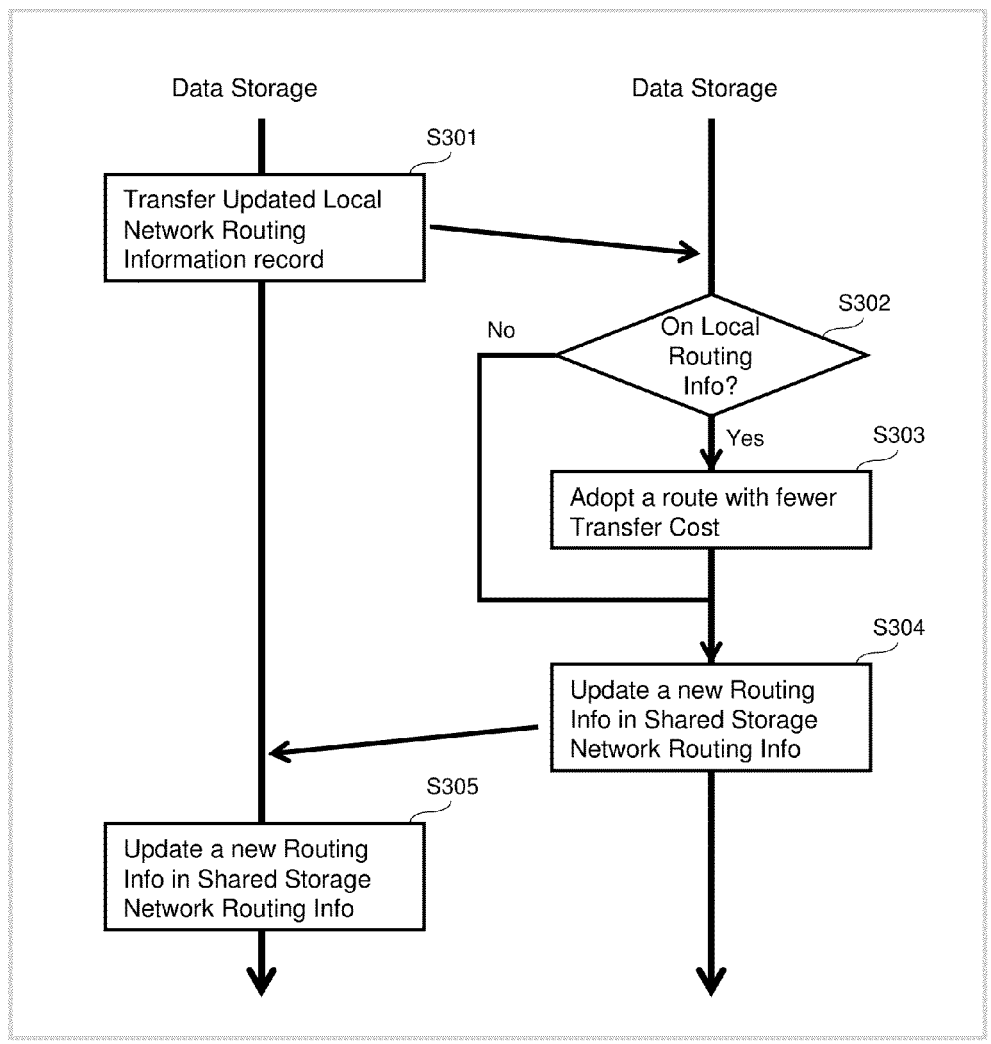
FIG. 22 is an example of a flow diagram to combine the local storage network route information among two data storage systems.

FIG. 22 is an example of a flow diagram to combine the local storage network route information 1406 among two data storage systems 100 (e.g., 100A and 100B). After detecting a newly connected device on the local network port, a data storage 100A adds a new routing information entry on the local storage network information 1406. Then the data storage 100A transfers the new route information entry to another data storage 100B (step S301). The data storage 100B receives the new route information and then searches its local storage network route information 1406 to confirm if there is a route information that is the same as that received from the original data storage 100 (step S302). In the example of FIG. 15, after the data storage 100B receives a new entry to express a path target to the network interface 210F by a transfer cost of "2," it searches and finds the same target route entry for the network interface 210F by a transfer cost of "1." If the result of step S302 is "Yes," it determines to adopt a route with a lower transfer cost (step S303). In the case of FIG. 15, the data storage 100B adopts its local entry that targets to the network interface 210F. It updates the route information on the shared storage network routing information 1407 (step S304, step S305).

Figure 23:
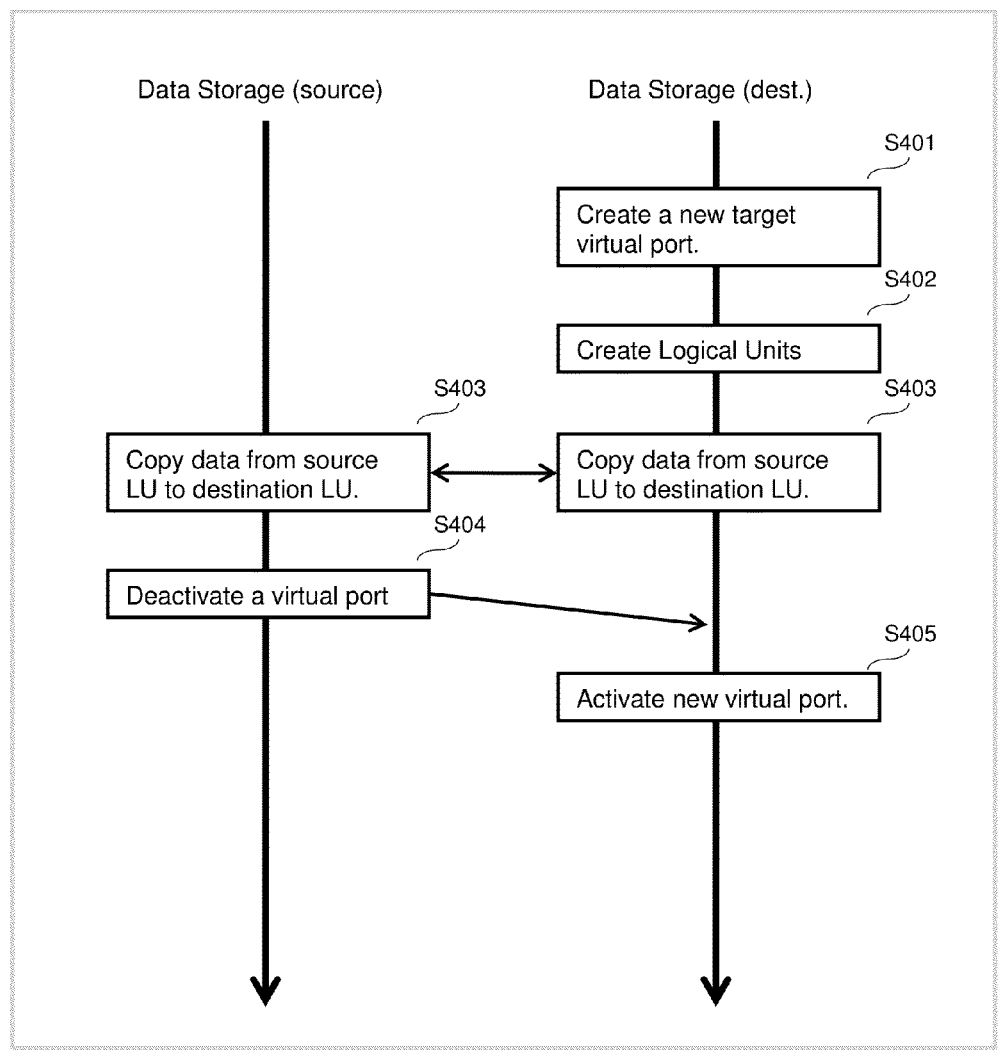
FIG. 23 is an example of a flow diagram of data migration beyond a data storage system.

FIG. 23 is an example of a flow diagram of data migration beyond a data storage system 100. A destination storage 100 (i.e., migration target device) creates a new virtual port 520 (step S401). This virtual port 520 has the same identifier as the source port 520. Then it creates a logical unit 530 on the port 520 (step S402). It is clear that new entry is added to the LU configuration information 1409. Then data copy program 1404 runs data copy from source LU to destination LU beyond the device (step S403). After data copy is completed, the source storage 100 deactivates the source virtual port 520 (step S404). Just after step S404, the target virtual port 520 is activated (step S405). The data migration is typically performed in response to a request from the management server 400.

Figure 24:
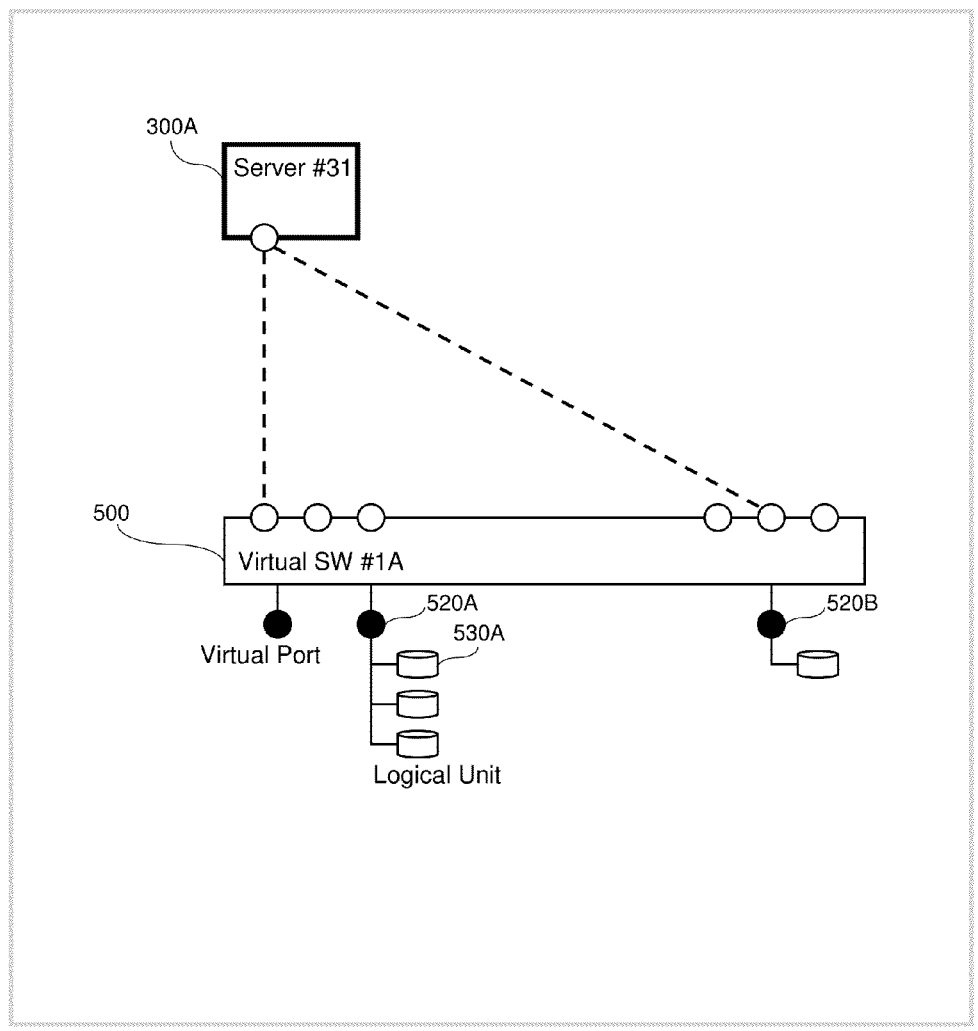
FIG. 24 is an example of a logical illustration of a virtual port over a virtual switch.

FIG. 24 is an example of a logical illustration of a virtual port 520 over a virtual switch 500. In this embodiment, a hardware boundary across the data storage 100 can be ignored, so that the virtual port location is flexible over the virtual switch 500. Also, the server 300 and the switch 200 would not get any impact caused by data migration. They do not have to reconfigure their configurations, and have a very short I/O service interruption period that happens at step S404 and S405.

Of course, the system configuration illustrated in FIG. 19 is purely exemplary of information systems in which the present invention may be implemented, and the invention is not limited to a particular hardware configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for nondisruptive data migration and I/O load balancing over multipath connections. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A system comprising:
    a first data storage system including at least one first interface port, a first CPU, a first memory, and a plurality of first logical units;
    a second data storage system including at least one second interface port, a second CPU, a second memory, and a plurality of second logical units, the second data storage system connected to the first data storage system;
    a plurality of switches; and
    a server which is connected with the first data storage system via a first group of the switches and is connected with the second data storage system via a second group of the switches, the first group and the second group having at least one switch which is not included in both the first group and the second group;
    wherein the first data storage system receives I/O commands targeted to the plurality of first logical units from the server via the first group of switches;
    wherein the first data storage system maintains a first information regarding the ports of both the first storage system and the second data storage system;
    wherein the first information is used to generate multipath communication between the server and the first data storage system, including at least one path which passes through the second data storage system and at least one other path which does not pass through the second data storage system; and
    wherein the first information includes load information for transmitting data between ports of the first data storage system and the plurality of switches and the server and load information for transmitting data between ports of the second data storage system and the plurality of switches and the server.

2. The system according to claim 1,
    wherein the ports of both the first and second data storage systems are identified by WWPN.

3. The system according to claim 1,
    wherein one of the first and second data storage systems is a source system for migration of data to the other of the first and second data storage systems as a destination system; and
    wherein for data migration, the destination system creates a virtual port as a target port which has same identifier as a source port on the source system, and creates a logical unit on the target port, the source system runs data copy from a logical unit containing the data in the source system to the logical unit on the target port in the destination system, and deactivates the source port on the source system, and the destination system activates the target port on the destination system.

4. The system according to claim 1,
    wherein in response to a detection of a device newly connected to one of the ports of the first data storage system, the first data storage system adds information related to a path between the newly connected device and the connected port of the first data storage system and notifies the added information to the plurality of switches, the server, and the second data storage system via connections to the first data storage system.

5. The system according to claim 1, further comprising:
    a management computer connected to one of the switches;
    wherein in response to a request from the management computer, the switch updates path information between ports of the server and at least one of the first and second data storage systems.

6. A first data storage system in a system which includes a second data storage system having at least one second interface port, a plurality of switches, and a server which is connected with the first data storage system via a first group of the switches and is connected with the second data storage system via a second group of the switches, the first group and the second group having at least one switch which is not included in both the first group and the second group, the first data storage system comprising:
    at least one first interface port;
    a first CPU;
    a first memory; and
    a plurality of first logical units;

wherein the first data storage system receives I/O commands targeted to the plurality of first logical units from the server via the first group of switches;

wherein the first data storage system maintains a first information regarding the ports of both the first storage system and the second data storage system;

wherein the first information is used to generate multipath communication between the server and the first data storage system, including at least one path which passes through the second data storage system and at least one other path which does not pass through the second data storage system; and wherein the first information includes load information for transmitting data between ports of the first data storage system and the plurality of switches and the server and load information for transmitting data between ports of the second data storage system and the plurality of switches and the server.

7. The first data storage system according to claim 6,
wherein the ports of both the first and second data storage systems are identified by WWPN.

8. The first data storage system according to claim 6,
wherein the second data storage system is a source system for migration of data to the first data storage system as a destination system; and wherein for data migration, the first data storage system:
creates a virtual port as a target port which has same identifier as a source port on the second data storage system,
creates a logical unit on the target port, and
activates the target port on the first data storage system, after data copy is run from a logical unit containing the data in the second data storage system to the logical unit on the target port in the first data storage system, and after the source port on the second data storage system is deactivated.

9. The first data storage system according to claim 6,
wherein in response to a detection of a device newly connected to one of the ports of the first data storage system, the first data storage system adds information related to a path between the newly connected device and the connected port of the first data storage system and notifies the added information to the plurality of switches, the server, and the second data storage system via connections to the first data storage system.

10. A multipath communication method in a system which includes a first data storage system including at least one first interface port, a first CPU, a first memory, and a plurality of first logical units; a second data storage system including at least one second interface port, a second CPU, a second memory, and a plurality of second logical units, the second data storage system connected to the first data storage system; a plurality of switches; and a server which is connected with the first data storage system via a first group of the switches and is connected with the second data storage system via a second group of the switches, the first group and the second group having at least one switch which is not included in both the first group and the second group; the method comprising:

receiving, by the first data storage system, an I/O command targeted to at least one of the plurality of first and second logical units from the server via the switches;

maintaining, by the first data storage system, a first information regarding the ports of both the first storage system and the second data storage system; and using the first information to generate multipath communication between the server and the first data storage system, including at least one path which passes through the second data storage system and at least one other path which does not pass through the second data storage system;

wherein the first information includes load information for transmitting data between ports of the first data storage system and the plurality of switches and the server and load information for transmitting data between ports of the second data storage system and the plurality of switches and the server.

11. The method according to claim 10, further comprising:
identifying the ports of both the first and second data storage systems by WWPN.

12. The method according to claim 10, further comprising a data migration process for migrating data from one of the first and second data storage systems as a source system to the other of the first and second data storage systems as a destination system, the data migration process comprising:
creating a virtual port as a target port which has same identifier as a source port on the source system;
creating a logical unit on the target port;
running data copy from a logical unit containing the data in the source system to the logical unit on the target port in the destination system;
deactivating the source port on the source system; and
activating the target port on the destination system.

13. The method according to claim 10, further comprising:
in response to a detection of a device newly connected to one of the ports of the first data storage system, the first data storage system adding information related to a path between the newly connected device and the connected port of the first data storage system and notifying the added information to the plurality of switches, the server, and the second data storage system via connections to the first data storage system.

14. The method according to claim 10, further comprising:
in response to a request from a management computer, updating path information between ports of the server and at least one of the first and second data storage systems.

* * * * *